May 19, 1931. J. SCHERMULY 1,805,850
AGRICULTURAL IMPLEMENT
Filed Sept. 15, 1928
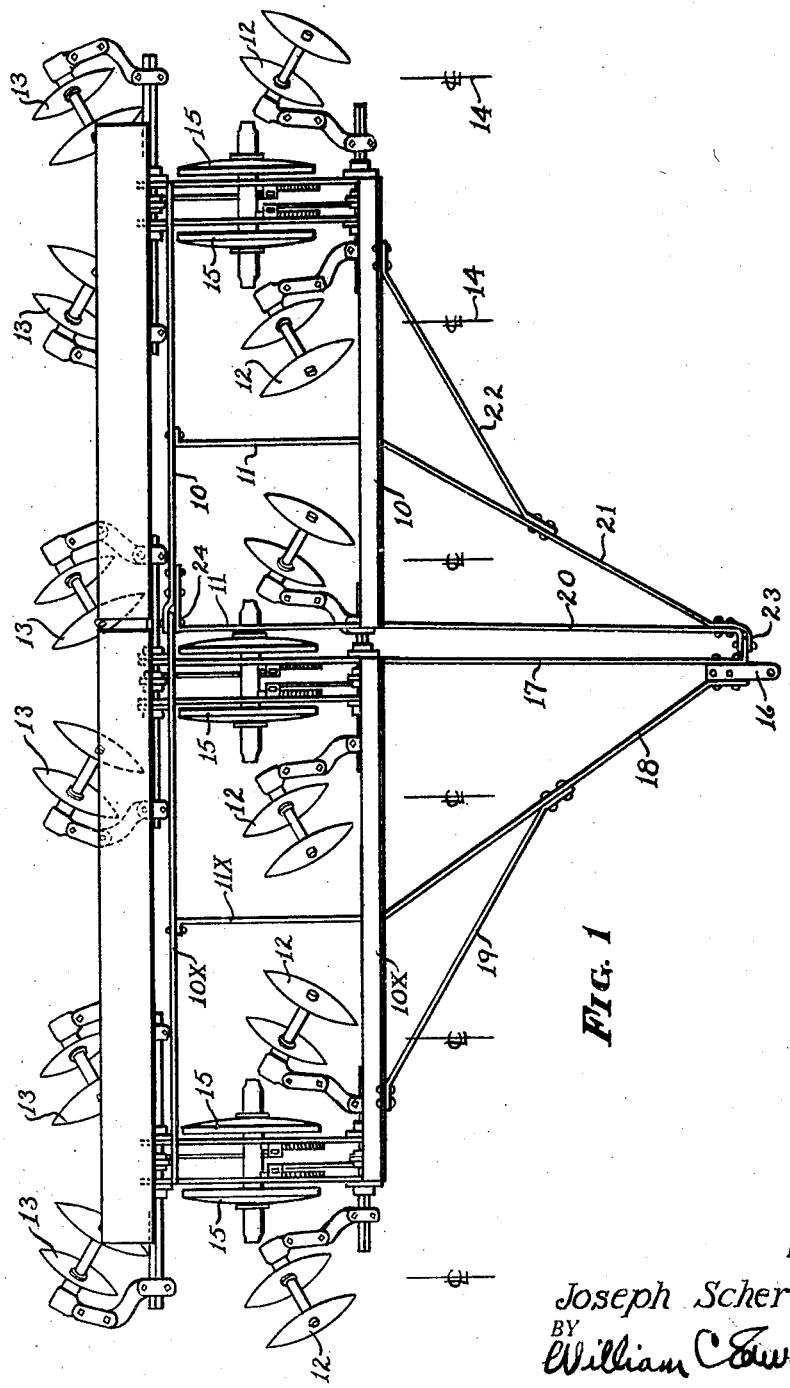
INVENTOR.
Joseph Schermuly
BY
William C. Edwards Jr.
ATTORNEY.

Patented May 19, 1931

1,805,850

UNITED STATES PATENT OFFICE

JOSEPH SCHERMULY, OF WICHITA, KANSAS

AGRICULTURAL IMPLEMENT

Application filed September 15, 1928. Serial No. 306,122.

The invention relates to agricultural implements such as ridge busters and the like and has for its object to allow for adjusting the frame of the machine to ground conditions. For purposes of illustration, my invention is shown upon a wide implement known as a ridge buster or ridge leveling machine as used in leveling the ground after listing. In the drawing, Fig. 1 is shown a ridge buster adapted for leveling six ridges. It is obvious that in a machine as wide as this that the ground level will so vary that unless some means were employed such as that later described, that the unit ridge busters would at times be out of or deeply in the ground, and for this reason I employ a hinged frame element which permits of the composite machine to adapt itself to such ground conditions as found.

Referring to Fig. 1 at the right thereof at 10 and 10 are seen parallel frame elements connected by tie elements 11. From this frame at spaced intervals may be adjustably positioned the unit ridge busting means such as seen at 12 and 13, suitably carried in the usual method and with adjusting means for arranging the discs in a preferred relationship to the ridge centers 14. Wheels 15 follow in the lister rows and carry the frame. A second frame of like character to that seen at 10—11—10 is disclosed at the left of the figure at 10x—11x—10x and is similarly equipped with wheels 15 and disc means 12 and 13.

At 16 is seen the pull bar for attachment to the tractor or horse evener. From this member 16 lead tie bars 17, 18, 19 connecting to the frame 10x as will be readily understood. Tie bars 20, 21 and 22 connect from the frame 10 as seen. At 23 is a hinged connection between the forward ends of the tie bars 17 and 20, while at 24 is seen a hinged connection between the rear frame elements 10 and 10x. Thus the tractor pull at 16 serves to pull the composite frame work 10 and 10x to properly perform the function of the agricultural implement, while the hinge elements 23 and 24 allow for the machine to accommodate itself to changing ground positions and the purpose of the invention. It will be noted that the left rectangular frame section 10x—11x—10x is carried by two sets of wheel elements 15—15 while the second rectangular frame element 10—11—10 is carried by but one set of wheel elements 15—15; that the rear element 10x of the left hand section projects for a distance to engage with and form a hinged connection at 24 with the corner element of the second section 10—11—10; and that the bar elements 17 and 20 lead in parallelism forwardly from their respective inner corner frame connections. This placing of the pull at 16 so closely adjacent the hinge 23 permits of a flexible functioning of the paired rectangular frames different than would be the case if the point of hinge were made at the adjacent ends of the forward elements 10 and 10x.

Such modifications may be employed as lie within the scope of the appended claim.

Having fully described my invention, what I now claim as new and desired to secure by Letters Patent is:

In an agricultural implement; a pair of right and left rectangular frame elements; a pair of wheel transport sets associated with one frame and a single set of wheel transport means associated with the second set; a hinge connection between the inner corner of one rectangular frame and the adjacent corner of the second frame as extended towards said corner element of the first frame; each frame having forwardly extending elements arrranged in parallelism with and adjacent the line of draft of the composite machine, each forwardly extending element being rigid to its particular frame; said parallel extending elements having a hinged connection forwardly from the paired rectangular frames; and a draw bar element rigid to one of said forwardly extending elements and closely adjacent to said hinge.

In testimony whereof I affix my signature.

JOSEPH SCHERMULY.